(12) United States Patent
Olien et al.

(10) Patent No.: US 7,522,152 B2
(45) Date of Patent: Apr. 21, 2009

(54) PRODUCTS AND PROCESSES FOR PROVIDING HAPTIC FEEDBACK IN RESISTIVE INTERFACE DEVICES

(75) Inventors: Neil T. Olien, Montreal (CA); Pedro Gregorio, Verdun (CA)

(73) Assignee: Immersion Corporation, San Jose, CA (US)

(\*) Notice: Subject to any disclaimer, the term of this patent is extended or adjusted under 35 U.S.C. 154(b) by 856 days.

(21) Appl. No.: 10/855,902

(22) Filed: May 27, 2004

(65) Prior Publication Data

US 2005/0275967 A1 Dec. 15, 2005

(51) Int. Cl.
*G09G 5/00* (2006.01)

(52) U.S. Cl. .............. 345/156; 345/161; 345/163; 345/168; 345/173; 463/37; 463/38; 715/701; 715/702

(58) Field of Classification Search ........... 345/156, 345/163, 167, 168, 173, 177, 179, 184; 715/701, 715/702; 463/37, 38; 74/822–824, 826; 310/154, 156, 306, 800; 335/91–93, 136, 335/153

See application file for complete search history.

(56) References Cited

U.S. PATENT DOCUMENTS

| | | | |
|---|---|---|---|
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,795,150 A | 3/1974 | Eckhardt | |
| 3,902,687 A | 9/1975 | Hightower | |
| 3,903,614 A | 9/1975 | Diamond et al. | |
| 4,160,508 A | 7/1979 | Salsbury | |
| 4,175,650 A | 11/1979 | Miller | |
| 4,206,837 A | 6/1980 | Brown et al. | |
| 4,236,325 A | 12/1980 | Hall et al. | |
| 4,262,240 A | 4/1981 | Arai | |
| 4,296,851 A | 10/1981 | Pierce | |
| 4,400,790 A | 8/1983 | Chambers et al. | |
| 4,513,235 A | 4/1985 | Acklam et al. | |
| 4,553,080 A | 11/1985 | Cannon et al. | |
| 4,560,983 A | 12/1985 | Williams | |
| 4,581,491 A | 4/1986 | Boothroyd | |
| 4,599,070 A | 7/1986 | Hladky et al. | |

(Continued)

FOREIGN PATENT DOCUMENTS

EP 0111992 6/1984

(Continued)

OTHER PUBLICATIONS

U.S. Appl. No. 10/902,462, Olien.

(Continued)

*Primary Examiner*—Henry N Tran
(74) *Attorney, Agent, or Firm*—Kilpatrick Stockton LLP (57) ABSTRACT

Products and processes for providing haptic feedback in a user interface are disclosed. One exemplary embodiment of an apparatus comprises a first element comprising a first surface, a second element comprising a second surface, and an actuator configured vary a force between the first and second surfaces. In one embodiment, the second element may be configured to be displaced relative to first element in a degree of freedom. In another embodiment, at least one of the first surface and the second surface may comprise a thermoplastic polymer.

23 Claims, 3 Drawing Sheets

U.S. PATENT DOCUMENTS

| | | |
|---|---|---|
| 4,643,282 A | 2/1987 | Edl |
| 4,652,805 A | 3/1987 | Kohn |
| 4,706,294 A | 11/1987 | Ouchida |
| 4,708,656 A | 11/1987 | De Vries et al. |
| 4,713,007 A | 12/1987 | Alban |
| 4,718,529 A | 1/1988 | Kroeger et al. |
| 4,758,165 A | 7/1988 | Tieman et al. |
| 4,823,106 A | 4/1989 | Lovell |
| 4,859,922 A | 8/1989 | Tauchenitz et al. |
| 4,868,549 A | 9/1989 | Affinito et al. |
| 4,891,764 A | 1/1990 | McIntosh |
| 4,930,770 A | 6/1990 | Baker |
| 4,934,694 A | 6/1990 | McIntosh |
| 4,947,097 A | 8/1990 | Tao |
| 5,019,761 A | 5/1991 | Kraft |
| 5,022,407 A | 6/1991 | Horch et al. |
| 5,035,242 A | 7/1991 | Franklin |
| 5,038,089 A | 8/1991 | Szakaly |
| 5,059,842 A | 10/1991 | Uehara |
| 5,078,152 A | 1/1992 | Bond |
| 5,086,296 A | 2/1992 | Clark |
| 5,116,051 A | 5/1992 | Moncrief et al. |
| 5,116,180 A | 5/1992 | Fung et al. |
| 5,185,561 A | 2/1993 | Good et al. |
| 5,186,695 A | 2/1993 | Mangseth et al. |
| 5,187,630 A | 2/1993 | MacKay et al. |
| 5,189,355 A | 2/1993 | Larkins et al. |
| 5,191,320 A | 3/1993 | MacKay |
| 5,212,473 A | 5/1993 | Louis |
| 5,220,260 A | 6/1993 | Schuler |
| 5,240,417 A | 8/1993 | Smithson et al. |
| 5,270,689 A | 12/1993 | Hermann |
| 5,271,290 A | 12/1993 | Fischer |
| 5,275,174 A | 1/1994 | Cook |
| 5,299,810 A | 4/1994 | Pierce |
| 5,309,140 A | 5/1994 | Everett |
| 5,334,027 A | 8/1994 | Wherlock |
| 5,368,484 A | 11/1994 | Copperman et al. |
| 5,381,080 A | 1/1995 | Schnell et al. |
| 5,382,373 A | 1/1995 | Carlson et al. |
| 5,396,266 A | 3/1995 | Brimhall |
| 5,466,213 A | 11/1995 | Hogan |
| 5,492,312 A | 2/1996 | Carlson |
| 5,542,672 A | 8/1996 | Meredith |
| 5,547,382 A | 8/1996 | Yamasaki |
| 5,559,432 A | 9/1996 | Logue |
| 5,577,581 A | 11/1996 | Eberwein et al. |
| 5,578,238 A | 11/1996 | Weiss et al. |
| 5,580,249 A | 12/1996 | Jacobsen et al. |
| 5,591,082 A | 1/1997 | Jensen et al. |
| 5,665,946 A | 9/1997 | Nishijima et al. |
| 5,683,615 A | 11/1997 | Munoz |
| 5,705,085 A | 1/1998 | Munoz et al. |
| 5,711,746 A | 1/1998 | Carlson |
| 5,714,978 A | 2/1998 | Yamanaka et al. |
| 5,721,566 A | 2/1998 | Rosenberg et al. |
| 5,730,655 A | 3/1998 | Meredith |
| 5,766,016 A | 6/1998 | Sinclair |
| 5,767,836 A | 6/1998 | Scheffer et al. |
| 5,767,839 A | 6/1998 | Rosenberg |
| 5,781,172 A | 7/1998 | Engel et al. |
| 5,785,630 A | 7/1998 | Bobick et al. |
| 5,816,105 A | 10/1998 | Adelstein |
| 5,816,823 A | 10/1998 | Naimark et al. |
| 5,914,705 A | 6/1999 | Johnson et al. |
| 5,944,151 A | 8/1999 | Jakobs et al. |
| 6,002,184 A | 12/1999 | Delson et al. |
| 6,008,800 A | 12/1999 | Pryor |
| 6,087,829 A | 7/2000 | Jager |
| 6,100,476 A | 8/2000 | Adamietz et al. |
| 6,111,577 A | 8/2000 | Zilles et al. |
| 6,128,006 A | 10/2000 | Rosenberg et al. |
| 6,147,422 A | 11/2000 | Delson et al. |
| 6,154,201 A | 11/2000 | Levin et al. |
| 6,211,861 B1 | 4/2001 | Rosenberg et al. |
| 6,215,470 B1 | 4/2001 | Rosenberg et al. |
| 6,219,034 B1 | 4/2001 | Elbing et al. |
| 6,243,078 B1 | 6/2001 | Rosenberg |
| 6,262,717 B1 | 7/2001 | Donohue et al. |
| 6,271,828 B1 | 8/2001 | Rosenberg et al. |
| 6,271,833 B1 | 8/2001 | Rosenberg et al. |
| 6,271,834 B1 | 8/2001 | May et al. |
| 6,283,859 B1 | 9/2001 | Carlson et al. |
| 6,307,285 B1 | 10/2001 | Delson et al. |
| 6,337,678 B1 | 1/2002 | Fish |
| 6,348,772 B1 | 2/2002 | May |
| 6,373,465 B2 * | 4/2002 | Jolly et al. .................. 345/156 |
| 6,394,239 B1 | 5/2002 | Carlson |
| 6,400,352 B1 | 6/2002 | Bruneau et al. |
| 6,420,806 B2 | 7/2002 | Wittig |
| 6,422,941 B1 | 7/2002 | Thorner et al. |
| 6,468,158 B1 | 10/2002 | Ootori et al. |
| 6,480,752 B1 | 11/2002 | Blume et al. |
| 6,486,872 B2 | 11/2002 | Rosenberg et al. |
| 6,589,117 B1 | 7/2003 | Moritome et al. |
| 6,591,175 B2 | 7/2003 | Numata et al. |
| RE38,242 E | 9/2003 | Engel et al. |
| 6,613,997 B2 | 9/2003 | Oster et al. |
| 6,636,202 B2 | 10/2003 | Ishmael, Jr. et al. |
| 6,637,311 B2 | 10/2003 | Barden |
| 6,640,940 B2 | 11/2003 | Carlson |
| 6,646,632 B2 | 11/2003 | Wegmuller et al. |
| 2001/0052893 A1 | 12/2001 | Jolly et al. |
| 2002/0044132 A1 | 4/2002 | Fish |
| 2002/0067336 A1 | 6/2002 | Wegmuller et al. |
| 2002/0084983 A1 | 7/2002 | Boldy |
| 2002/0158842 A1 | 10/2002 | Guy et al. |
| 2003/0006958 A1 | 1/2003 | Onodera |
| 2003/0038774 A1 | 2/2003 | Piot et al. |
| 2003/0079948 A1 | 5/2003 | Jolly et al. |
| 2003/0080939 A1 | 5/2003 | Kobayashi |
| 2003/0184518 A1 | 10/2003 | Numata et al. |
| 2004/0040800 A1 | 3/2004 | Anastas et al. |

FOREIGN PATENT DOCUMENTS

| | | |
|---|---|---|
| EP | 0349086 | 1/1990 |
| EP | 0640902 A2 | 3/1995 |
| JP | 01-003664 | 7/1990 |
| JP | 02-109714 | 1/1992 |
| JP | 04-007371 | 8/1993 |
| JP | 05-193862 | 1/1995 |

OTHER PUBLICATIONS

Adelstein, "Design and Implementation of a Force Reflecting Manipulandum for Manual Control research," DSC-vol. 42, Advances in Robotics, Edited by H. Kazerooni, pp. 1-12, 1992.

Adelstein, "A Virtual Environment System For The Study of Human Arm Tremor," Ph.D. Dissertation, Dept. of Mechanical Engineering, MIT, Jun. 1989.

Aukstakalnis et al., "Silicon Mirage: The Art and Science of Virtual Reality," ISBN 0-938151-82-7, pp. 129-180, 1992.

Badescu, "Rotary Haptic Knob for Vehicular Instrument Controls," Proceedings of the 10th Symp. On Haptic Interfaces For Virtual Envir. & Teleoperator Systs. (HAPTICS'02), 2002.

Baigrie, "Electric Control Loading—A Low Cost, High Performance Alternative," Proceedings, pp. 247-254, Nov. 6-8, 1990.

Bejczy et al., "A Laboratory Breadboard System For Dual-Arm Teleoperation," SOAR '89 Workshop, JSC, Houston, TX, Jul. 25-27, 1989.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy, "Generalization of Bilateral Force-Reflecting Control of Manipulators," Proceedings Of Fourth CISM-IFToMM, Sep. 8-12, 1981.

Bejczy, "Sensors, Controls, and Man-Machine Interface for Advanced Teleoperation," Science, vol. 208, No. 4450, pp. 1327-1335, 1980.

Bejczy, et al., "Universal Computer Control System (UCCS) For Space Telerobots," CH2413-3/87/0000/0318501.00 1987 IEEE, 1987.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Caldwell et al., "Enhanced Tactile Feedback (Tele-Taction) Using a Multi-Functional Sensory System," 1050-4729/93, pp. 955-960, 1993.

Colgate, J. Edward, et al., "Implementation of Stiff Virtual Walls in Force-Reflecting Interfaces," Department of Mechanical Engineering, Northwestern University, Evanston, IL, Sep. 1993.

"Cyberman Technical Specification," Logitech Cyberman SWIFT Supplement, Apr. 5, 1994.

Eberhardt et al., "Including Dynamic Haptic Perception by The Hand: System Description and Some Results," DSC-vol. 55-1, Dynamic Systems and Control: vol. 1, ASME 1994.

Eberhardt et al., "OMAR—A Haptic display for speech perception by deaf and deaf-blind individuals," IEEE Virtual Reality Annual International Symposium, Seattle, WA, Sep. 18-22, 1993.

Gobel et al., "Tactile Feedback Applied to Computer Mice," International Journal of Human-Computer Interaction, vol. 7, No. 1, pp. 1-24, 1995.

Gotow et al., "Controlled Impedance Test Apparatus for Studying Human Interpretation of Kinesthetic Feedback," WA11-11:00, pp. 332-337.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bulletin, "Mouse Ball-Actuating Device With Force and Tactile Feedback," vol. 32, No. 9B, Feb. 1990.

Iwata, "Pen-based Haptic Virtual Environment," 0-7803-1363-1/93 IEEE, pp. 287-292, 1993.

Jacobsen et al., "High Performance, Dextrous Telerobotic Manipulator With Force Reflection," Intervention/ROV '91 Conference & Exposition, Hollywood, Florida, May 21-23, 1991.

Jones et al., "A perceptual analysis of stiffness," ISSN 0014-4819 Springer International (Springer-Verlag); Experimental Brain Research, vol. 79, No. 1, pp. 150-156, 1990.

Kaczmarek et al., "Tactile Displays," Virtual Environment Technologies.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Marcus, "Touch Feedback in Surgery," Proceedings of Virtual Reality and Medicine The Cutting Edge, Sep. 8-11, 1994.

McAffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.

Ouhyoung et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

Patrick et al., "Design and Testing of A Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Pimentel et al., "Virtual Reality: through the new looking glass," $2^{nd}$ Edition; McGraw-Hill, ISBN 0-07-050167-X, pp. 41-202, 1994.

Rabinowitz et al., "Multidimensional tactile displays: Identification of vibratory intensity, frequency, and contactor area," Journal of The Acoustical Society of America, vol. 82, No. 4, Oct. 1987.

Russo, "Controlling Dissipative Magnetic Particle Brakes in Force Reflective Devices," DSC-vol. 42, Advances in Robotics, pp. 63-70, ASME 1992.

Russo, "The Design and Implementation of a Three Degree of Freedom Force Output Joystick," MIT Libraries Archives Aug. 14, 1990, pp. 1-31, May 1990.

Scannell, "Taking a Joystick Ride," Computer Currents, Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Snow et al., "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSC-vol. 42, Advances in Robotics, pp. 55-61, ASME 1992.

Tadros, "Control System Design for a Three Degree of Freedom Virtual Environment Simulator Using Motor/Brake Pair Actuators", MIT Archive © Massachusetts Institute of Technology, pp. 1-88, Feb. 1990.

Terry et al., "Tactile Feedback In A Computer Mouse," Proceedings of Fourteenth Annual Northeast Bioengineering Conference, University of New Hampshire, Mar. 10-11, 1988.

* cited by examiner

```
┌─────────────────────────────┐
│   PROVIDING A MAGNETIC      │
│      TARGET 301             │
└─────────────────────────────┘
              │
              ▼
┌─────────────────────────────┐
│   PROVIDING A MAGNETIC      │
│       CORE 302              │
└─────────────────────────────┘
              │
              ▼
┌─────────────────────────────┐
│  INTERPOSING A FRICTIONAL   │
│   ELEMENT BETWEEN THE       │
│  MAGNETIC TARGET AND THE    │
│    MAGNETIC CORE 303        │
└─────────────────────────────┘
```

FIG. 3

PRODUCTS AND PROCESSES FOR PROVIDING HAPTIC FEEDBACK IN RESISTIVE INTERFACE DEVICES

STATEMENT REGARDING FEDERALLY SPONSORED RESEARCH AND DEVELOPMENT

This invention was made in part with support from the federal government under Grant Number NSF DMII-0091589 awarded by the National Science Foundation. The federal government may have certain rights in this invention.

FIELD OF THE INVENTION

The present invention generally relates to products and processes for providing haptic feedback, and more particularly for providing resistive interfaces.

BACKGROUND

A device may incorporate a variety of technologies for providing haptic feedback, including active and/or resistive technologies. Active haptic feedback devices, including for example, motors, generally add energy to a system. Resistive, or passive, devices, such as brakes, generally remove energy from a system.

Resistive haptic feedback devices often rely on friction to output a haptic effect to a user. Materials used in such a device may wear prematurely or unevenly as a result of friction between moving elements. A coefficient of friction between such moving elements may change over time as a result of this wear. The performance of a resistive haptic feedback device may be altered by wear caused by friction.

Some attempts to minimize some of these deleterious effects of friction have focused on the use of lubricants. Lubricants, however, may not be desirable for several reasons. Some lubricants may mitigate, and in some circumstances alter, desired haptic effects. Some lubricants deteriorate over time, and require replacement. Additionally, the addition of lubricants adds to the cost of manufacturing, operating, and maintaining certain devices.

These, and other, attempts to overcome problems associated with friction have been less than entirely successful, and their utilization in devices have produced somewhat unsatisfactory results for users.

SUMMARY

The present invention provides products and processes for providing resistive friction interfaces. In one exemplary embodiment of the present invention, an apparatus comprises a first element comprising a first surface, a second element comprising a second surface, and an actuator configured to vary a force between the first and second surfaces. In one embodiment, the second element may be configured to be displaced relative to first element in a degree of freedom. In another embodiment, at least one of the first surface and the second surface may comprise a thermoplastic polymer.

This exemplary embodiment is mentioned not to limit the invention, but to provide an example of an embodiment of the invention to aid understanding. Exemplary embodiments are discussed in the Detailed Description, and further description of the invention is provided there. Advantages offered by the various embodiments of the present invention may be understood by examining this specification.

BRIEF DESCRIPTION OF THE DRAWINGS

The accompanying drawings, which constitute part of this specification, help to illustrate embodiments of the invention. In the drawings, like numerals are used to indicate like elements throughout.

DETAILED DESCRIPTION

Embodiments of the present invention include products and processes for providing haptic feedback in a user interface device. In some interface devices, cutaneous feedback (such as, without limitation, vibration, texture, and heat), is also provided to a user, in addition to kinesthetic feedback (such as, without limitation, forces or resistances sensed by muscles, tendons, and/or joints) both subsumed under the phrase, and more generally known collectively as, "haptic feedback." The present invention may be embodied in handheld devices such as, for example, mobile phones, so-called personal digital assistants ("PDAs"), camcorders, control knobs, computer mice, joysticks, and other devices.

Embodiments of the present invention provide products and processes for providing haptic feedback in resistive interface devices. Multiple embodiments of the invention exist. By way of introduction and example, in one exemplary embodiment of the present invention, a friction interface between two surfaces of a haptic feedback device may be provided in which one surface comprises a thermoplastic polymer. The other surface may be the same or similar material or another material, such as a metallic material or a non-metallic material. Generally, friction and wear rate properties may be considered in material selection.

The two surfaces of the friction interface may move or be displaced relative to each other. An actuator may control, e.g. vary, a clamping-type force between the two surfaces forming the friction interface. Examples of suitable actuators may comprise a magnet, an electromagnet, a canonical motor, a piezoelectric element, a pneumatic element, a hydraulic element, an element comprising a shape memory alloy, and an electrostatic element. Other suitable actuators may be used, such as those described further below. The actuator may also include a biasing element, e.g., spring, to offset the clamping force or to assist clamping.

When the actuator is energized, the friction interface may exhibit a proportional resistance to motion in one or more directions tangent to the friction interface. The friction coefficient of the friction interface is the proportionality constant. The present invention may provide a resistive haptic effect in more than one degree of freedom.

Several examples of embodiments of the present invention include: a joystick with one actuator but two degrees of freedom of motion, e.g., pitch and yaw when a spherical friction surface is used; a resistive knob with rotary haptics and push haptics when a cylindrical friction surface is used; a planar slider in one or two degrees of freedom of motion when a planar friction surface is used. The result also may be a single degree of freedom (e.g., rotary knob, rotary scroll wheel, or slider).

This introduction is given to introduce the reader to the general subject matter of the application. One skilled in the art will understand that the invention is not limited to such subject matter. Exemplary embodiments are described below.

Figure 1:
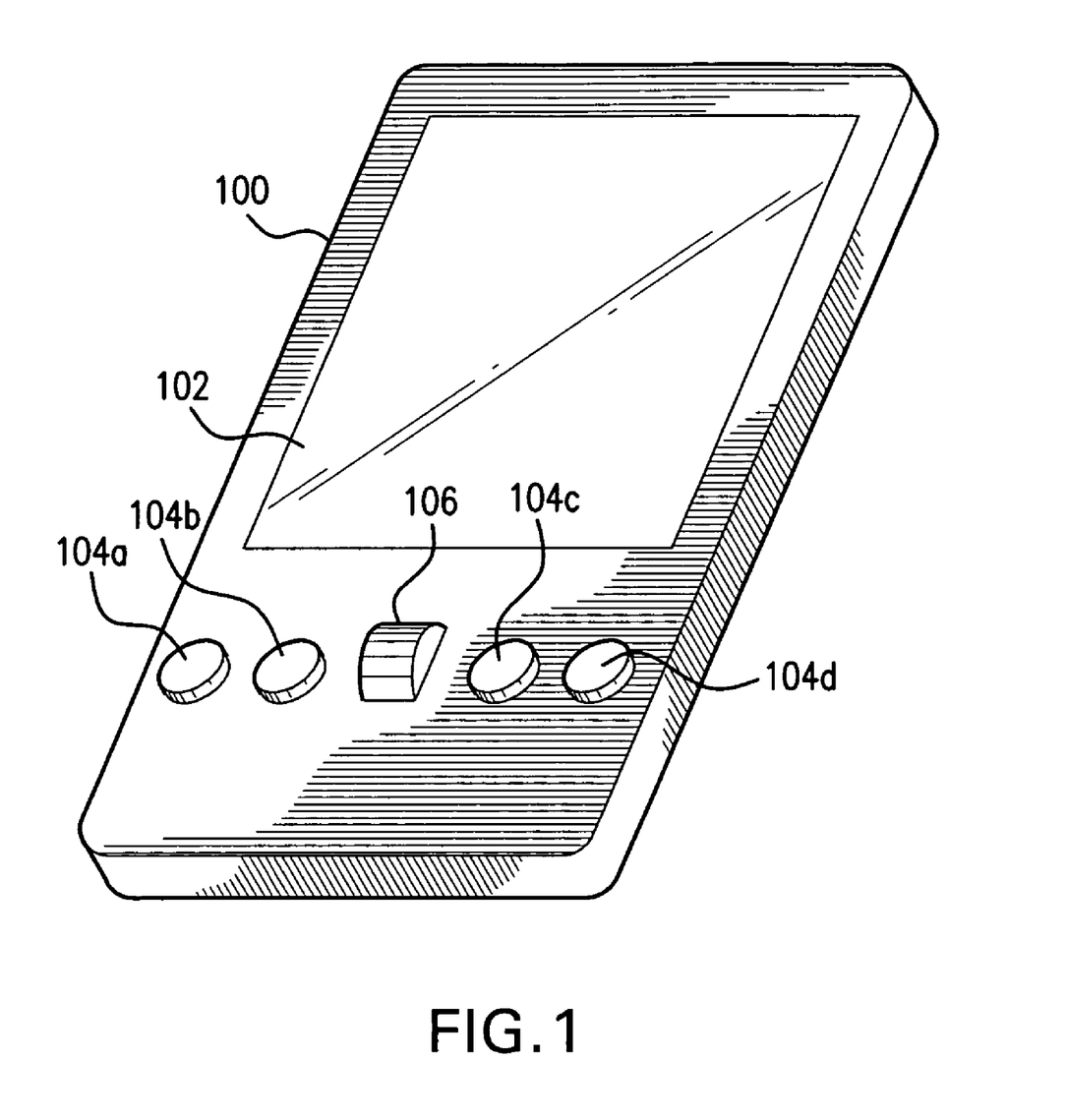
FIG. 1 shows an electronic device including an apparatus operable to provide haptic feedback to the device according to an embodiment of the present invention.

Referring now to FIG. 1, an electronic device 100, such as for example a personal digital assistant (PDA), incorporating an embodiment of the present invention is shown. The electronic device 100 comprises a display screen 102 and one or more manipulanda, e.g., interface elements that a user of the electronic device 100 can manipulate. In the embodiment shown in FIG. 1, the manipulanda comprise a plurality of buttons 104a, 104b, 104c, 104d, and scroll wheel 106.

Information (through the generation of a signal) is generally input into the electronic device 100 through the manipulanda. Information may be input by physically contacting the manipulanda with a digit of a hand, or with a device, such as a stylus. Alternatively, information may be transmitted to the electronic device 100 remotely or wirelessly from another device or processor (not shown) that is in communication with the electronic device 100.

The manipulanda may be used to control various aspects of functionality of the electronic device 100. For example, in one embodiment, a user may utilize buttons 104a-d to access specific applications, such as an address book. Once a user has accessed the address book application, the user may utilize the scroll wheel 106 to navigate through various elements of a user interface, such as menus or a list of names contained in the address book application.

The embodiment shown in FIG. 1 provides haptic feedback to the scroll wheel 106 to enhance a user's interaction with the device. A device according to the present invention may provide haptic feedback in various physical mechanisms, such as the scroll wheel 106.

Figure 2:
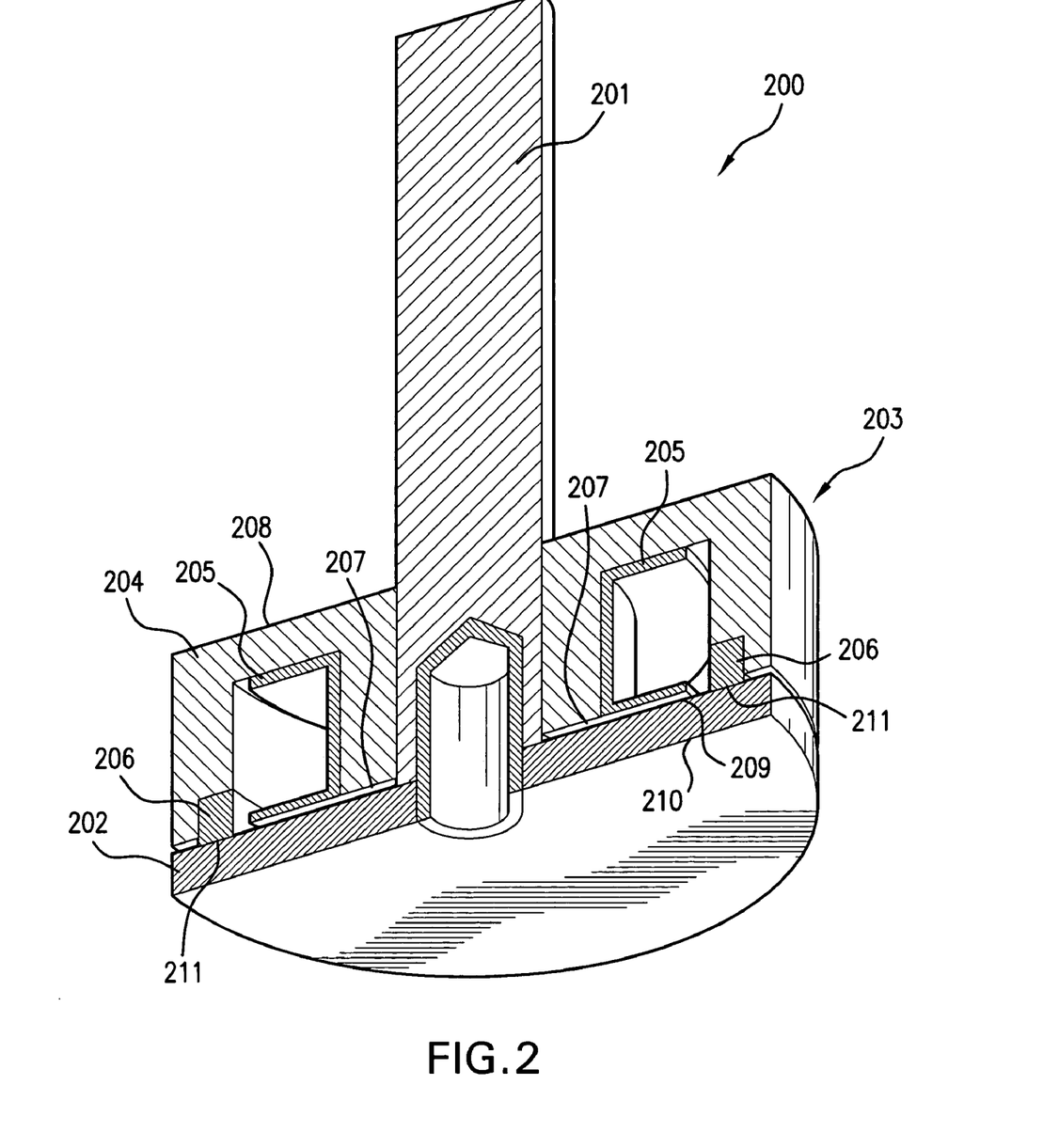
FIG. 2 shows a cutaway view of an embodiment of an apparatus according to the present invention operable to provide haptic feedback to the device of FIG. 1.

Referring now to FIG. 2, a cut-away drawing of a passive haptic feedback mechanism 200 is shown. The passive haptic feedback mechanism 200 comprises a shaft 201, a magnetic target 202, and an actuator 203. The magnetic target 202 may be coupled to one end of the shaft 201. In one embodiment, the magnetic target 202 may be fixedly attached to the shaft 201. The magnetic target 202 generally may be displaced about a center of the shaft 201.

The magnetic target 202 may be coupled to the scroll wheel 106. In one embodiment, the magnetic target 202 may comprise the scroll wheel 106. In another embodiment, the magnetic target 202 may not rotate independently from the scroll wheel 106. In yet another embodiment, the magnetic target 202 may rotate independently from the scroll wheel 106.

The magnetic target 202 may be adapted to be displaced in at least one degree of freedom. In one embodiment, for example, a first degree of freedom may be a rotary degree of freedom. In the embodiment shown, an axis of rotation may be coaxial with a center axis of the shaft 201. In another embodiment, the magnetic target 202 may be displaced in a linear degree of freedom such as, for example, a reciprocating movement along the axis of the shaft 201.

The magnetic target 202 may comprise a first surface 209 and a second surface 210. The first surface 209 may be coupled to the magnetic target 202, or may be integrally formed with the magnetic target 202. The first surface 209 and the second surface 210 may be generally parallel to each other. The magnetic target 202 may be formed generally in a disk-like shape. The magnetic target 202 may be formed in other suitable shapes.

The magnetic target 202 may be formed from a transition metal alloy. In one embodiment, the magnetic target 202 may be formed of a nickel-plated steel. Alternatively, the magnetic target 202 may be formed from other suitable materials or combination of materials.

The actuator 203 may be configured to communicate a haptic effect to and/or through one of the manipulanda, such as the scroll wheel 106, in a degree of freedom. In one embodiment, the actuator 203 may not be free to rotate, but may be displaced in a reciprocating movement in the axial direction of the shaft 201. In another embodiment, the actuator 203 may rotate about the shaft 201.

In one embodiment, the actuator 203 comprises an electromagnetic brake, which comprises a magnetic core 204 and an electromagnetic coil 205. The electromagnetic coil 205 may be disposed within a volume of the magnetic core 204. In other embodiments, the actuator 203 may comprise other suitable types of brakes as well as other forms, such as a resistive slider device. In one embodiment, the magnetic core 204 may comprise a pot core, an E-core, or a Terfinol core.

In one embodiment, the magnetic core 204 may comprise a first surface 207 and a second surface 208. The first surface 207 may be coupled with the magnetic core 204, or may be integrally formed with the magnetic core 204. Generally, the first surface 207 and the second surface 208 may be substantially parallel to one another. Other suitable arrangements and configurations of the magnetic core 204 may be used.

In one embodiment, the first surface 207 of the magnetic core 204 may be disposed in facing opposition to the first surface 209 of the magnetic target 202. The first surface 207 of the magnetic core 204 may be in communication with the first surface 209 of the magnetic target 202. In one embodiment, the first surface 207 of the magnetic core and the first surface 209 of the magnetic target 202 may be operable to be displaced relative to one another in at least one degree of freedom such as, for example, a linear degree of freedom and/or a rotary degree of freedom.

The scroll wheel mechanism 200 may comprise a frictional element 206. The frictional element 206 may comprise a surface 211. The surface 211 may be coupled to the frictional element 206, or may be integrally formed with the frictional element 206.

In one embodiment, the frictional element 206 may comprise a thermoplastic polymer. In another embodiment, the frictional element 206 may comprise an acetal resin. In yet another embodiment, the frictional element 206 may be formed of a synthetic compound sold under the trademark Delrin®100KM, manufactured by E.I du Pont de Nemours and Co. Alternatively, other suitable materials may be used for the frictional element 206, such as for example, nylon compounds or homopolymer acetal compounds. Suitable substitutes for the frictional element 206 may generally exhibit properties similar to the compounds mentioned above, including high friction and low wear of contacting surfaces.

The frictional element 206 may be disposed in communication with the actuator 203. In one embodiment, the frictional element 206 may be coupled with the magnetic core 204. The frictional element 206 may be coupled with the first surface 207 of the magnetic core 204. In another embodiment, the first surface 211 of the frictional element 206 may contact the first surface 207 of the magnetic core 204.

In a further embodiment, the first surface 211 of the frictional element 206 and the first surface 207 of the magnetic core 204 may be operable to be displaced relative to one another in at least one degree of freedom such as, for example, a linear degree of freedom and/or a rotary degree of freedom.

In one embodiment, the frictional element 206 may be interposed between the magnetic target 202 and the magnetic core 204. The frictional element 206 may be interposed between the first surface 209 of the magnetic target 202 and the first surface 207 of the magnetic core 204. In one embodiment, the frictional element 206 may protrude from the first surface 207 of the magnetic core. In another embodiment, the frictional element 206 may protrude from the first surface 209 of the magnetic target 202.

In another embodiment, the frictional element 206 may be coupled with the magnetic target 202. The frictional element 206 may be coupled with the first surface 209 of the magnetic target 202. The first surface 211 of the frictional element 206 may contact the first surface 209 of the magnetic target 202.

In a further embodiment, the first surface 211 of the frictional element 206 and the first surface 209 of the magnetic target 202 may be operable to be displaced relative to one another in at least one degree of freedom such as, for example, a linear degree of freedom and/or a rotary degree of freedom.

In general, the frictional element 206 may prevent direct physical contact between the magnetic target 202 and the magnetic core 204, and in one embodiment between the first surface 209 of the magnetic target 202 and the first surface 207 of the magnetic core 204. However, intermediate or incidental contact between the magnetic target 202 and the magnetic core 204 may not affect the operation of the haptic feedback mechanism 200.

The frictional element 206 may also provide a surface (such as the surface 211) on which one of the magnetic target 202 and the magnetic core 204 may rotate with respect to the other. In another embodiment, the frictional element 206 may rotate with respect to both the magnetic target 202 and the magnetic core 204.

The frictional element 206 may be adapted to form a gap between the magnetic target 202 and the magnetic core 204. In one embodiment, a distance between the first surface 209 of the magnetic target 202 and the first surface 207 of the magnetic core 204 may comprise a range between approximately 0.0005 inches and approximately 0.0040 inches.

In one embodiment, the distance between the first surface 209 of the magnetic target 202 and the first surface 207 of the magnetic core 204 may comprise approximately 0.0005 inches or greater. In another embodiment, the distance between the first surface 209 of the magnetic target 202 and the first surface 207 of the magnetic core 204 may comprise approximately 0.0040 inches or less. Other suitable distances may be used.

It is to be understood that the physical dimensions provided herein are merely for the sake of example, and for describing embodiments of the present invention. A variety of factors may be considered in selecting suitable dimensions, such as for example, torque, available power, grades of materials used, and the distance between the magnetic target 202 and the magnetic core 204. Thus, the dimensions discussed herein in no way limit the scope of the invention as defined by the appended claims.

The frictional element 206 may comprise a ring. In one embodiment, an inner diameter of the frictional element 206 may be approximately 0.80 inches and an outer diameter of the frictional element 206 may be approximately 0.95 inches. Generally, an outer diameter of the magnetic core 204 may be greater than the outer diameter of the frictional element 206. However, in one embodiment, the outer diameter of the frictional element 206 may be greater than the outer diameter of the magnetic core 204.

Other suitable variations of the embodiments described above may be used. For example, the frictional element 206 may comprise a broken ring or a series of protrusions from the magnetic target 202 and/or the magnetic core 204. In another example, the frictional element 206 may comprise a first frictional element (not shown) and a second frictional element (not shown) in which the first frictional element protrudes from the first surface 209 of the magnetic target 202 and the second frictional element protrudes from the first surface 207 of the magnetic core 204.

Thus, in such an example, the first and second frictional elements may contact one another instead of either the magnetic target 202 or the magnetic core 204. Additionally, the first and second frictional elements may form concentric rings such that both first and second frictional elements contact both the magnetic target 202 and the magnetic core 204. Other suitable configurations and arrangements may be used.

Although depicted as being substantially planar, the surface 211 of the frictional element 206, and first surface 207 of the magnetic core 204, and the first surface 209 of the magnetic target may comprise other suitable shapes or profiles. For example, any of the surfaces (i.e., 211, 207, 209) may comprise a curvature or surface discontinuities, or comprise shapes such as, for example, spherical, cylindrical, saddle-shaped, or conical. The surfaces 207, 209, 211 also may be shaped to accommodate a shape or other physical property of the actuator 203, e.g., a coil or portion of a coil protruding from a surface of an actuator (not shown).

In one embodiment, the actuator 203 may be operable to generate a controlled normal force between the frictional element 206 and the magnetic target 202. When the electromagnetic coil 205 receives a current, it develops a magnetic attractive force in the magnetic core 204, and the magnetic attractive force acts upon the magnetic target 202.

The magnetic force, however, may not cause perceptible displacement, movement, or deflection of the magnetic target 202, magnetic core 204, or the frictional element 206, which may be in contact with one another in any other suitable operable combination. Displacement, movement, or deflection may be measured, detected, or observed by a variety of devices, gages, or detectors.

The frictional element 206 may be adapted to oppose a displacement or movement of the magnetic target 202 in a rotary degree of freedom. Through contact with the magnetic target 202 and the magnetic core 204, the frictional element 206 (and the respective contacting surfaces) is operable to exert a resistive force against movement (generally rotary) of either or both the magnetic target 202 and the magnetic core 204. A change in magnetic force exerted by the magnetic core 204 may vary the resistive force against the movement of either or both the magnetic target 202 and the magnetic core 204. The magnetic force may comprise a component substantially normal to the magnetic target 202. In another embodiment, the magnetic force may comprise a component substantially normal to the movement or displacement of the magnetic target.

In one embodiment, a coefficient of static friction of the coupled frictional element 206 and the magnetic target 202 (e.g., the contacting surfaces 211, 209) may be less than or substantially equal to a coefficient of dynamic friction of the coupled frictional element 206 and the magnetic target 202.

In another embodiment, a coefficient of static friction of the coupled frictional element 206 and the magnetic core 204 (e.g., the contacting surfaces 211, 207) may be less than or substantially equal to a coefficient of dynamic friction of the coupled frictional element 206 and the magnetic core 204.

Thus, if the manipulandum, e.g., scroll wheel 106, is coupled to at least one of the magnetic target 202 and the actuator 203, i.e., the magnetic core 204, the resistive force may cause the scroll wheel 106 to stop, to slow its rotation, to exert a force a user may overcome, or to exert a force a user cannot readily overcome, if at all. Without the application of a magnetic force by the magnetic core 204, i.e., in the off position, a user may readily be able to rotate the scroll wheel 106 with little, if any, resistance offered by the haptic feedback mechanism 200.

The magnetic force of the magnetic core 204 may be varied dynamically to vary the haptic effect of the haptic feedback mechanism 200. In one embodiment, when the electromagnetic coil 205 receives a pulsed current, a haptic effect in the form of a vibration may be created where a user is in contact with the manipulandum, e.g., scroll wheel 106 and while the scroll wheel 106 is moving.

In one embodiment, a biasing element, such as a spring (not shown), mounted between the magnetic target 202 and the magnetic core 204 of the actuator 203 may cause the two elements to separate when the electromagnetic coil 205 is not energized. In another embodiment, the biasing element may assist the magnetic force generated by the actuator 203.

One embodiment of the present invention comprises a controller (not shown), such as a processor, that controls the application of current generated by a power supply (not shown) to the electromagnetic coil 205 of the actuator 203. Processors may include, for example, digital logic processors operable to process input, execute algorithms, and generate output as necessary to create the desired haptic feedback in response to the inputs received from the manipulandum. Such controllers may include, for example, a microprocessor, an Application Specific Integrated Circuit (ASIC), and state machines.

Such processors include, or may be in communication with, media, for example, computer readable media, which stores instructions that, when executed by the processor, may cause the processor to perform certain steps or actions to be carried out. Embodiments of computer readable media include, but are not limited to, an electronic, optical, magnetic, or other storage or transmission device capable of providing a processor with computer readable instructions.

Other examples of media include, but are not limited to, a floppy disk, CD-ROM, magnetic disk, memory chips, ROM, RAM, ASIC, configured processor, all optical media, all magnetic tape or other magnetic media, or any other medium from which a computer processor can read. Also, various other forms of computer readable media may transmit or carry instructions to a computer, including a router, private or public network, or other transmission device or channel. The processor, and the processing, described may be in one or more structures, and may be dispersed through one or more structures.

A controller according to the present invention may be capable of generating a variety of haptic effects. For example, the controller may create effects, such as detents, between entries in the address book application described with reference to FIG. 1. The controller may create additional effects as well, including, for example, bumps, vibrations, and stops by applying various currents to the electromagnetic coil 205 shown in FIG. 2.

Coding (not shown) may be applied or formed on the magnetic core 204, from which a sensing device (not shown) is operable to sense position and relative movement between the magnetic core 204 and the device 100 housing. For example, the coding may comprise a series of light and dark markings capable of being distinguished by an optical sensor.

The sensing device communicates to the processor the relative movement between the magnetic core 204 and the housing of the device 100 in a sensor output signal. From the sensor output signal, the processor is able to ascertain the position of the scroll wheel 106 in rotational communication with the magnetic core 204.

The processor device may be in communication with an Input/Output (I/O) port connected to a power supply (not shown). The processor may send a feedback control signal in the form of an electrical current generated by the power supply to the electromagnetic coil 205 to create a desired haptic effect in response to receiving the sensor output signal from the sensing device.

It should be noted that the present invention may comprise systems having different structures and configurations than that which is shown in FIG. 2. For example, in some systems according to the present invention, the magnetic target 202 may comprise a linear slider. The haptic feedback mechanism 200 is merely exemplary, and is used to help explain the embodiments of the present invention illustrated in FIGS. 1-3 and described herein.

Figure 3:
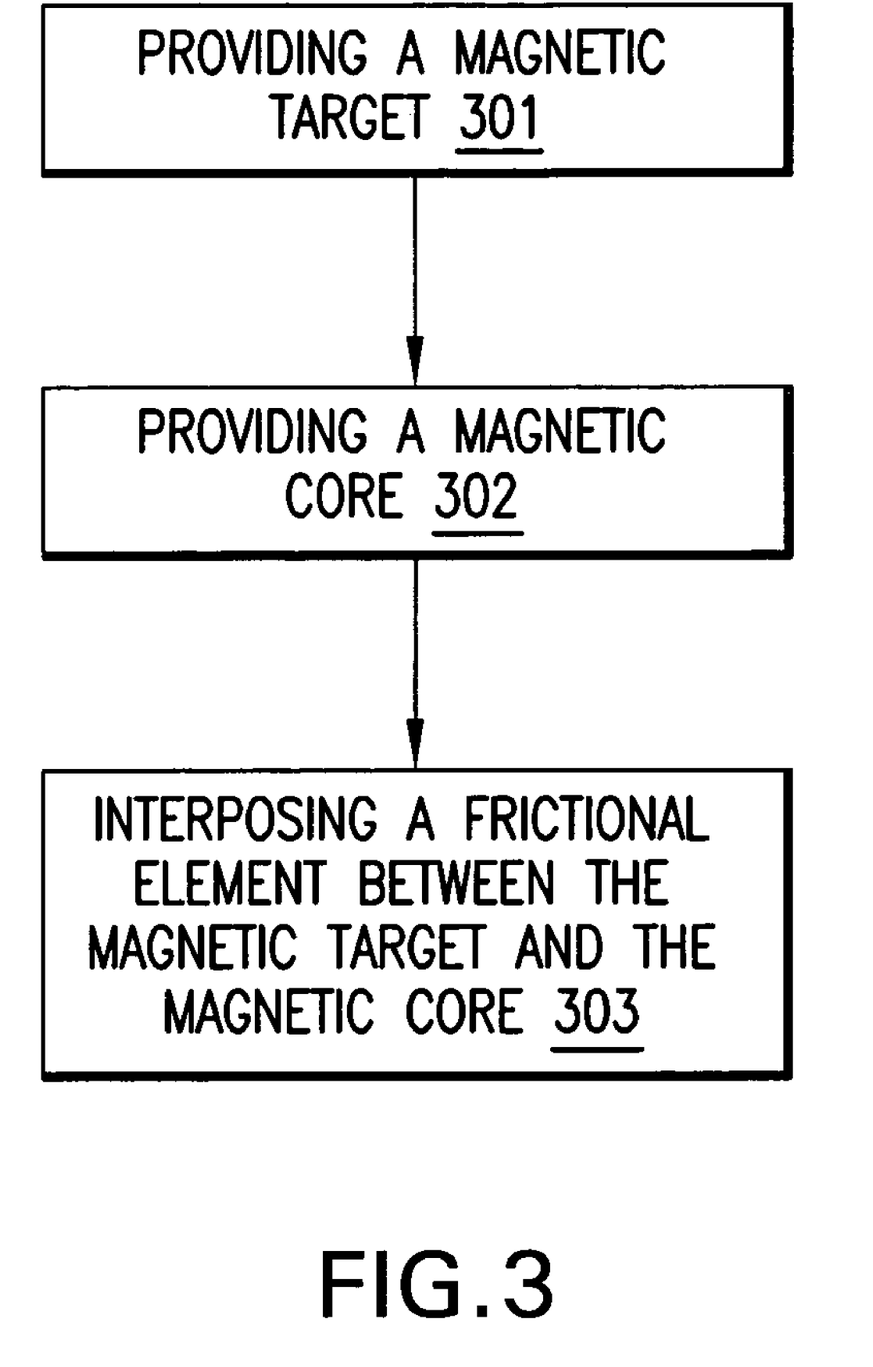
FIG. 3 shows a high-level flow chart of a method according to an embodiment of the present invention.

Referring now to FIG. 3, a method 300 according to an embodiment of the present invention is shown. The method 300 may be employed to make a device that provides haptic feedback in a user interface device, such as the haptic feedback mechanism 200 described above. Items shown in FIGS. 1 and 2 are referred to in describing FIG. 3 to aid understanding of the method 300 shown. However, embodiments of method 300 according to the present invention may be used to make a wide variety of devices.

Referring now to FIG. 3, block 301 indicates that method 300 comprises providing a magnetic target. In one embodiment, the magnetic target may comprise a first surface and a second surface. The magnetic target may be similar to that described above. Alternatively, other suitable magnetic targets may be used.

The magnetic target may be formed generally in a disk-like shape. The magnetic target may be formed in other suitable shapes. The magnetic target may comprise a transition metal. In one embodiment, the magnetic target may comprise a nickel-plated steel. Alternatively, the magnetic target may be formed from other suitable materials or combinations of materials.

The magnetic target may be coupled to a manipulandum, such as the scroll wheel 106, as described above. In one embodiment, the magnetic target may comprise the manipulandum itself. The magnetic target may rotate independently from the manipulandum. In one embodiment, the magnetic target does not rotate independently from the manipulandum.

As indicated by block 302, the method 300 comprises providing a magnetic core. In one embodiment, the magnetic core comprises a first surface disposed in facing opposition to the first surface of the magnetic target. The magnetic core may comprise an electromagnet. Alternatively, the magnetic core may comprise a pot core, an E-core, or a Terfinol core. In one embodiment, the magnetic core may be coupled to the manipulandum. In another embodiment, the magnetic core may comprise the manipulandum itself.

As indicated by block 303, the method 300 comprises interposing a frictional element between the magnetic target and the magnetic core. In one embodiment, the frictional element may be interposed between the first surface of the magnetic target and the first surface of the magnetic core. The frictional element may be similar to that described above. Additionally, the configuration and arrangement of the frictional element with the magnetic core and the magnetic target may be similar to that described above. Alternatively, other suitable embodiments may be used.

The frictional element may comprise a thermoplastic polymer. In one embodiment, the frictional element may comprise an acetal polymer. In another embodiment, the frictional element may be formed of a compound sold under the trademark Delrin®, as discussed above. Alternatively, other suitable materials may be used for the frictional element, such as for example, nylon compounds or homopolymer acetal compounds.

In one embodiment, the frictional element may be coupled with the magnetic core. In another embodiment, the frictional element may be coupled with the magnetic target. Disposed between the magnetic target and the magnetic core, the frictional element may form a gap between the magnetic target and the magnetic core. In one embodiment, a distance between the first surface of the magnetic target and the first surface of the magnetic core comprises a range between approximately 0.0005 and approximately 0.0040 inches.

The frictional element may comprise a ring. Generally, an outer diameter of the magnetic core may be greater than the outer diameter of the frictional element. However, in one embodiment, the outer diameter of the frictional element may be greater than the outer diameter of the magnetic core.

The magnetic core may be operable to generate and exert a controlled normal force between the frictional element and the magnetic target. In one embodiment, the coefficient of static friction of the coupled frictional element and the magnetic target may be less than or substantially equal to a coefficient of dynamic friction of the coupled frictional element and the magnetic target. In another embodiment, the coefficient of static friction of the coupled frictional element and the magnetic core may be less than or substantially equal to a coefficient of dynamic friction of the coupled frictional element and the magnetic core.

While the present invention has been disclosed with reference to certain embodiments, numerous modifications, alterations, and changes to the described embodiments are possible without departing from the sphere and scope of the present invention, as defined by the appended claims. Accordingly, it is intended that the present invention not be limited to the described embodiments, but that it has the full scope defined language of the following claims and equivalents thereof.

That which is claimed:

1. An apparatus comprising:
   a first element comprising a first surface;
   a second element comprising a second surface, the second surface in contact with the first surface, the second surface configured to be displaced relative to the first element in a degree of freedom, at least one of the first surface and the second surface comprising a thermoplastic polymer,
   wherein a coefficient of static friction of the first surface and the second surface is less than or substantially equal to a coefficient of dynamic friction of the first surface and the second surface; and
   an actuator configured to vary a force between the first surface and the second surface.

2. The apparatus of claim 1, wherein the first element comprises the actuator and the second element comprises a magnetic target.

3. The apparatus of claim 1, wherein the first element comprises a magnetic target and the second element comprises the actuator.

4. The apparatus of claim 1, wherein the actuator comprises at least one of an electromagnet, a canonical motor, a piezoelectric element, a pneumatic element, a hydraulic element, a shape memory alloy, and an electrostatic element.

5. The apparatus of claim 1, wherein the thermoplastic polymer comprises an acetal polymer.

6. The apparatus of claim 1, wherein at least one of the first surface and the second surface comprises a substantially planar surface.

7. An apparatus comprising:
   a magnetic target comprising a surface;
   a magnetic core comprising a surface disposed in facing opposition to the surface of the magnetic target; and
   a frictional element interposed between the surface of the magnetic target and the surface of the magnetic core, the frictional element comprising a thermoplastic polymer,
   wherein a distance between the surface of the magnetic target and the surface of the magnetic core comprises a range between approximately 0.0005 and approximately 0.0040 inches.

8. The apparatus of claim 7, wherein a coefficient of static friction of the frictional element and the magnetic target is less than or substantially equal to a coefficient of dynamic friction of the frictional element and the magnetic target.

9. The apparatus of claim 7, wherein a coefficient of static friction of the frictional element and the magnetic core is less than or substantially equal to a coefficient of dynamic friction of the frictional element and the magnetic core.

10. The apparatus of claim 7, wherein the frictional element comprises a ring.

11. The apparatus of claim 10, wherein the magnetic core comprises a first diameter and the frictional element comprises a second diameter, the first diameter greater than the second diameter.

12. The apparatus of claim 7, wherein the magnetic core comprises an electromagnet.

13. The apparatus of claim 7, wherein the magnetic core is operable to generate a magnetic force substantially normal to the surface of the magnetic target.

14. The apparatus of claim 7, wherein the surface of the magnetic core is disposed in communication with the surface of the magnetic target.

15. An apparatus comprising:
    a magnetic target;
    an actuator in communication with the magnetic target; and
    a frictional element in communication with the actuator and operable to exert a resistive force against the magnetic target, the frictional element comprising a thermoplastic polymer, the frictional element coupled with the magnetic target,
    wherein a coefficient of static friction of the frictional element and the magnetic target is less than or substantially equal to a coefficient of dynamic friction of the frictional element and the magnetic target.

16. The apparatus of claim 15, further comprising a manipulandum disposed in communication with at least one of the magnetic target and the actuator, wherein the actuator is operable to provide haptic feedback to the manipulandum.

17. The apparatus of claim 16, wherein the actuator comprises a magnetic core operable to generate a normal force between the frictional element and the magnetic target.

18. The apparatus of claim 17, wherein the frictional element is interposed between the magnetic target and the magnetic core.

19. The apparatus of claim 18, wherein the frictional element is coupled with the magnetic core.

20. The apparatus of claim 19, wherein a coefficient of static friction of the coupled frictional element and the magnetic core is less than or substantially equal to a coefficient of dynamic friction of the coupled frictional element and the magnetic core.

21. The apparatus of claim 15, wherein the frictional element comprises an acetal polymer.

22. The apparatus of claim 15, wherein the magnetic target comprises a nickel-plated steel.

23. The apparatus of claim 17, wherein a distance between the magnetic core and the magnetic target comprises a range between approximately 0.0005 and approximately 0.0040 inches.

\* \* \* \* \*

UNITED STATES PATENT AND TRADEMARK OFFICE
CERTIFICATE OF CORRECTION

| | | |
|---|---|---|
| PATENT NO. | : 7,522,152 B2 | Page 1 of 1 |
| APPLICATION NO. | : 10/855902 | |
| DATED | : April 21, 2009 | |
| INVENTOR(S) | : Olien et al. | |

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 856 days Delete the phrase "by 856 days" and insert -- by 1352 days --

Signed and Sealed this

Twenty-third Day of March, 2010

David J. Kappos
*Director of the United States Patent and Trademark Office*